United States Patent
Krauss et al.

(10) Patent No.: US 6,905,145 B2
(45) Date of Patent: Jun. 14, 2005

(54) CONNECTION OF A HOSE CLAMP AND A HOSE FOR PRE-POSITIONING THE HOSE CLAMP

(75) Inventors: Mathias Krauss, Maintal (DE); Bernd Beicht, Grossumstadt (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 10/688,366

(22) Filed: Oct. 16, 2003

(65) Prior Publication Data

US 2004/0080154 A1 Apr. 29, 2004

(30) Foreign Application Priority Data

Oct. 24, 2002 (DE) .......................................... 102 49 474

(51) Int. Cl.[7] .............................................. F16L 33/00
(52) U.S. Cl. ......................... 285/242; 285/253; 24/74 R
(58) Field of Search ........................... 285/242, 23, 252, 285/253; 24/274 R

(56) References Cited

U.S. PATENT DOCUMENTS

| 3,950,830 | A | * | 4/1976 | Duprez | 24/274 R |
| 3,981,053 | A | * | 9/1976 | Kreuzer | 24/274 R |
| 4,686,747 | A | * | 8/1987 | Bakdahl | 24/274 R |
| 5,410,781 | A | * | 5/1995 | Anjos et al. | 24/274 R |
| 5,504,978 | A | * | 4/1996 | Meyer, III | 24/274 R |
| 5,622,391 | A |   | 4/1997 | Belik |   |
| 6,116,657 | A | * | 9/2000 | Oetiker | 285/23 |
| 6,224,066 | B1 | * | 5/2001 | Oetiker | 277/634 |
| 6,389,654 | B1 | * | 5/2002 | Tunno et al. | 24/274 P |
| 6,530,609 | B1 | * | 3/2003 | Chatterton | 285/23 |
| 6,685,229 | B2 | * | 2/2004 | Morrison | 285/23 |

FOREIGN PATENT DOCUMENTS

| DE | 3543717 | 6/1987 |
| DE | 195 01 615 A1 | 8/1996 |
| EP | 0631080 | 12/1994 |

* cited by examiner

*Primary Examiner*—Aaron Dunwoody
(74) *Attorney, Agent, or Firm*—Friedrich Kueffner

(57) ABSTRACT

In a connection of a hose clamp and a hose that is provided with projections, wherein the hose clamp surrounding the hose is pre-positioned between the projections before tightening of the hose clamp on the hose, the projections are arranged on opposed sides of the hose clamp and have gaps. A locking strip with laterally projecting tabs is fastened on an inner side of the hose clamp. The laterally projecting tabs engage in a positive-looking way the gaps.

9 Claims, 1 Drawing Sheet

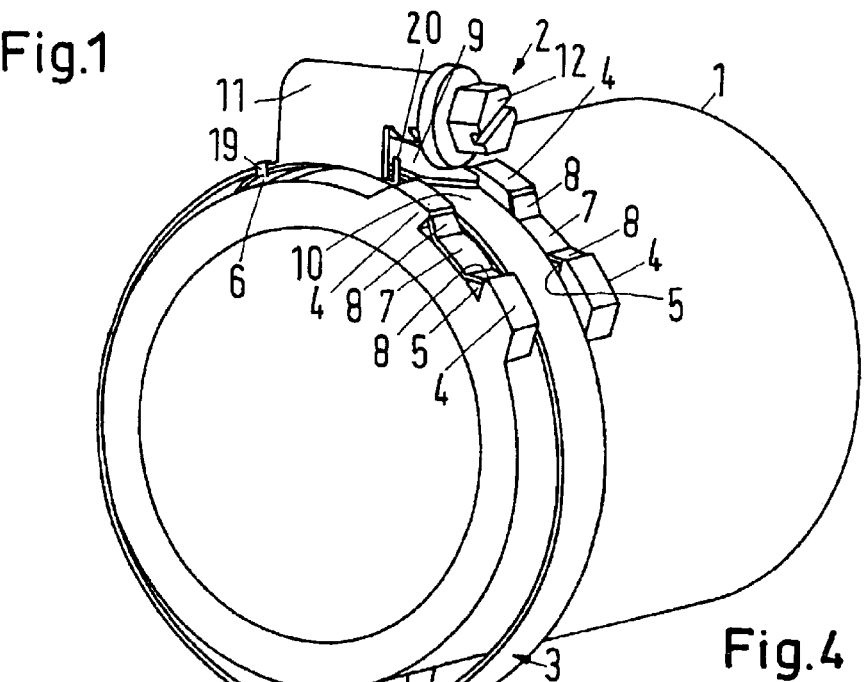
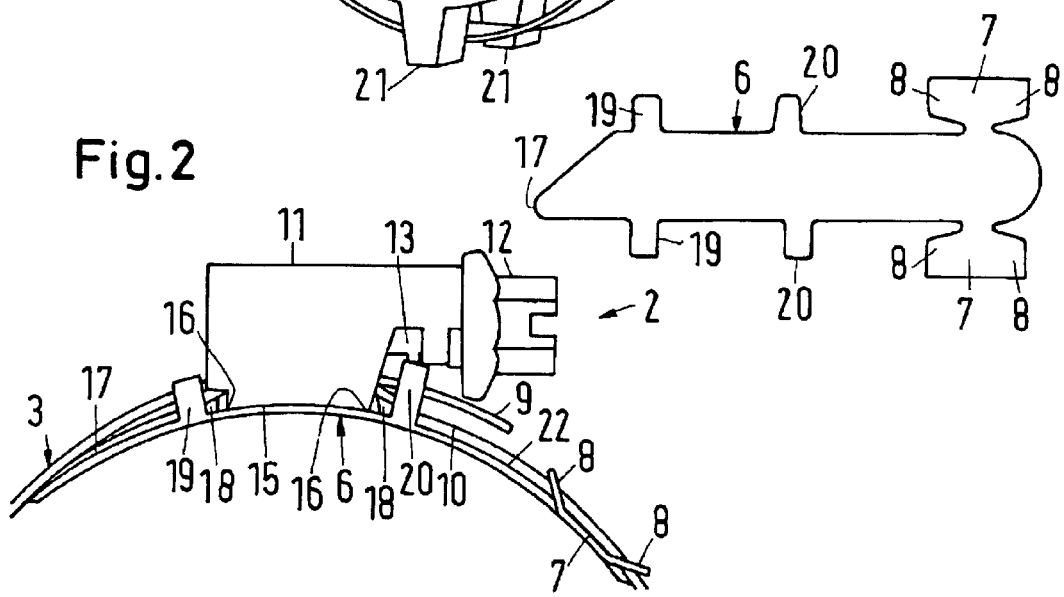
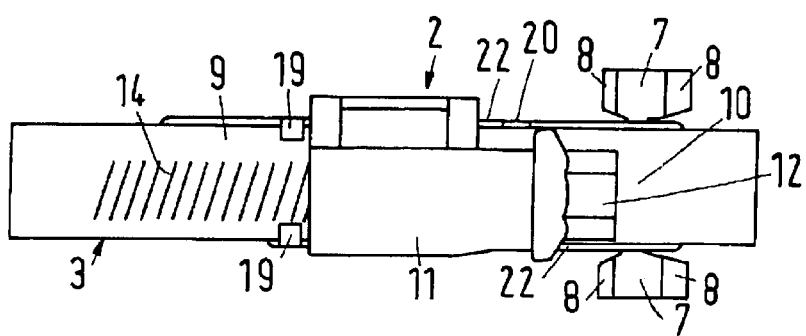

CONNECTION OF A HOSE CLAMP AND A HOSE FOR PRE-POSITIONING THE HOSE CLAMP

BACKGROUND OF THE INVENTION

1. Field of the Invention

The invention relates to a connection of a hose clamp with a hose provided with projections between which projections the hose clamp surrounding the hose is arranged for the purpose of pre-positioning the hose clamp relative to the hose before tightening the hose clamp on the hose.

2. Description of the Related Art

In a known device of this kind (German patent application 35 43 717 A1) the projections are peripherally extending beads. The beads prevent an axial movement of the hose clamp on the hose when the hose clamp is pre-positioned only loosely on the hose and is pushed together with the hose onto a pipe socket or the like and only thereafter tightened on the hose for the purpose of securing the hose on the pipe socket.

As long as the hose clamp is not tightened on the hose, it can rotate in any circumferential direction on the hose; in many cases, this is undesirable, in particular, when the hose clamp is a worm drive hose clamp whose clamping screw must be tightened by means of a screwdriver for clamping the hose clamp on the hose. When positioning the screwdriver on the screw, the worm drive hose clamp turns on the hose so that the hose clamp can no longer be tightened.

SUMMARY OF THE INVENTION

It is an object of the present invention to provide a connection of the aforementioned kind which prevents rotation of the hose clamp on the hose in the loosely pre-positioned arrangement of the hose clamp on the hose.

In accordance with the present invention, this is achieved in that the projections arranged on both sides of the hose clamp are provided with gaps; laterally projecting tabs of a locking strip fastened on the inner side of the hose clamp engage these gaps in a positive-locking way.

According to this solution, the hose clamp cannot rotate because the tabs, before and during exertion of force onto the hose clamp in the peripheral direction of the hose, rest against the projections and because the locking strip is fastened on the hose clamp.

Preferably, the locking strip covers a connecting location of the overlapping end sections of the clamping band of the hose clamp. The locking strip serves at the same time as a hose protecting device which covers edges at the connecting location and, in this way, prevents the edges from digging into the hose and, accordingly, the hose cannot be damaged by the edges; it serves also as a means for preventing substantially a non-uniform distribution of the tightening pressure about the periphery of the hose that is caused by edges or steps of the hose clamp because the locking strip is correspondingly thin or tapered at its ends or rounded so that its ends form a substantially continuous transition.

In this way, the hose clamp can be in the form of a worm drive hose clamp, wherein the locking strip extends across the closure housing bottom and in this way covers steps present at the transverse edges of the housing bottom that are axially arranged relative to the hose and also a step located on the free end of the end sections of the clamping band fastened within the closure housing.

It is beneficial when the projections of the hose are located on the side of the worm drive hose clamp where the clamping screw is positioned and when on each lateral edge of the locking strip a fastening tab is provided on the side of the closure housing facing away from the clamping screw head and engages across one of the lateral edges of the clamping band of the worm drive hose clamp. This type of attachment of the locking strip is simple and can be carried out easily.

Preferably, it is provided that at the side where the clamping screw head is located a guide tab for the clamping band of the worm drive hose clamp is provided on each lateral edge of the locking strip and projects radially outwardly. These guide tabs effect not only lateral guiding of the radial outer end section of the clamping band pulled out of the closure housing during clamping of the worm drive hose clamp but also prevent lateral pivoting of the closure housing relative to the locking strip during clamping of the clamping band.

Moreover, it is advantageous when diametrically opposed to the closure housing of the worm drive hose clamp two additional projections are provided on the hose on either side of the camping band. These additional projections prevent in a simple way a pivoting action of the closure housing during tightening of the worm drive hose clamp about a transverse axis of the hose and also an undesirable slanted position of the plane of the hose clamp relative to the longitudinal axis of the hose. The lateral edges of the camping band then do not cut into the hose material.

A further embodiment can reside in that the tabs of the locking strip engaging the gaps between the projections of the hose have prolongations in both circumferential directions of the hose, wherein the prolongations are bent radially outwardly at an obtuse angle and engage undercuts of the sidewalls of the gaps. With this configuration, the hose clamp cannot move in the radial direction while it is not yet tightened and its inner diameter in the not yet tightened state is greater than the hose diameter plus the height of the projections.

The edges of the locking strip can be bent radially outwardly. In this way, cutting of the edges into the hose material is prevented.

Preferably, the locking strip is made of metal. This material makes it possible to cut the locking strip to length and to tailor it from a much longer thin metal band and to subsequently bend the tabs into the required position.

BRIEF DESCRIPTION OF THE DRAWING

In the drawing:

FIG. 1 is a perspective view of a connection according to the invention of a conventional worm drive hose clamp with a hose, wherein the hose clamp is shown pre-positioned about the hose and not yet tightened;

FIG. 2 shows a side view of a worm drive hose clamp having connected thereto a locking strip of the connection according to the invention;

FIG. 3 is a plan view onto the worm drive hose clamp according to FIG. 2 with the locking strip; and FIG. 4 is a sheet metal blank of a locking strip according to the invention, cut to length from a metal strip and tailored, in a state before bending its tabs and its longitudinal edges.

DESCRIPTION OF THE PREFERRED EMBODIMENTS

As illustrated in FIG. 1, in the connection of a hose 1 with a hose clamp 2, illustrated as a worm drive hose clamp that is loosely pre-positioned about the hose 2, the hose 1 has on both sides of the clamping band 3 of the clamp 2 two projections 4, respectively, that are formed as a monolithic part of the hose 1. The two projections 4 positioned on one side of the clamping band 3, respectively, delimit a gap 5 therebetween which is aligned axially with the gap 5 between the two oppositely positioned projections 4. The sidewalls of the gaps 5 are undercut at an acute angle. Tabs 7 that project laterally from the locking strip 6 engage the gaps 5 in a positive-locking way. As also illustrated in FIGS. 2 and 3, the tabs 7 each have two prolongations 8 that extending in the circumferential direction of the hose 1 and project at an obtuse angle outwardly. The tabs 7 engage underneath the undercuts of the sidewalls of the gaps 5, as shown in FIG. 1, in order to prevent the locking strip 6 from falling out of the gaps 5.

The hose clamp 2 is arranged by means of its closure housing 11 that forms a connecting location of the overlapping end sections 9, 10 of the clamping band 3 in such a way onto the hose 1 that the projections 4 are positioned on the side of the head 12 of the clamping screw 13 of the hose clamp. The clamping screw 13 is rotatably supported in the housing 11 and engages threaded sections 14 on the exterior side of the radial outer end section 9 of the clamping band 3. The locking strip 6 covers the underside of the closure housing bottom 15 on whose inner side the other end section 10 is fastened and covers also the axial transverse edges 16 of the closure housing bottom 15 and the free end 17 of the end section 10. The housing bottom 15 is suspended between radially inwardly projecting grooves 18 provided in the end section 10.

On each lateral edge of the locking strip 6 there is also provided a fastening tab 19 that, in the mounted state of the hose clamp 2, is located on the side of the closure housing 11 facing away from the clamping screw head 12 and engages across one of the lateral edges of the clamping band 3, respectively. On each lateral edge of the locking strip 6 at the side of the clamping screw head 12 a guide tab 20 is provided for the clamping band 3 of the hose clamp 2; the guide tabs 20 project radially outwardly. The longitudinal edges 22 of the locking strip 6 are bent upwardly and radially outwardly.

The projections 4 resting laterally against both sides of the clamping band 3 prevent, on the one hand, axial movement of the hose clamp 2 on the hose 1. On the other hand, as a result of the engagement of the tabs 7 of the locking strip 6 between the projections 4 of the hose 1 on one side of the closure housing 11 and as a result of the attachment of the locking strip 6 by means of the fastening tabs 19 on the clamping band 3 on the other side of the closure housing 11, the hose clamp 2 cannot be rotated in the circumferential direction of the hose 1, in particular, when the clamping screw 13 is tightened by means of a screwdriver in order to clamp the hose clamp 2 onto the hose 1 and, in turn, clamp the hose 1 on the pipe socket onto which the hose 1 and the hose clamp 2 have been placed beforehand. The additional projections 21 between which the clamping band 3 is also secured laterally, prevent pivoting of the hose clamp 2 about the transverse axis of the hose 1 upon tightening of the clamping screw 13 so that the clamping band 3 upon tightening does not cut with its edges into the hose material. The guide tabs 20 prevent a lateral pivoting of the portion of the end section 9 that is pulled out of the housing by the clamping screw during tightening of the hose clamp before this portion moves into the space between the projections 14 and is guided between them. The upwardly projecting longitudinal edges 22 of the locking strip 6 prevent that the edges of the longitudinal side of the locking strip 6 cut into the hose material. The covering of the transverse edges 16 of the bottom 15 of the closure housing 11 and of the free end 17 of the end section 10 by the locking strip 6 prevents that their edges cut into the hose material and compensates substantially a non-uniform tightening pressure about the hose periphery between the hose 1 and the hose clamp 2. Moreover, transversely extending steps at the ends of the locking strip 6 are avoided by tapering the ends by providing a slant or by providing rounded portions, as illustrated in FIG. 4.

While specific embodiments of the invention have been shown and described in detail to illustrate the inventive principles, it will be understood that the invention may be embodied otherwise without departing from such principles.

What is claimed is:

1. A connection of a hose clamp and a hose, wherein the hose is provided with projections, and wherein the hose clamp surrounding the hose is pre-positioned between the projections before tightening of the hose clamp on the hose, the improvement comprising:

the projections being arranged on opposed sides of the hose clamp and having gaps;

a locking strip having laterally projecting tabs and being fastened on an inner side of the hose clamp;

wherein the laterally projecting tabs engage in a positive-looking way the gaps.

2. The connection according to claim 1, wherein the hose clamp has a clamping band with overlapping end sections, wherein the locking strip covers a connecting location of the overlapping end sections of the clamping band.

3. The connection according to claim 2, wherein the hose clamp is a worm drive hose clamp comprising a closure housing having a closure housing bottom, wherein the looking strip extends across the closure housing bottom.

4. The connection according to claim 3, wherein the projections of the hose are located on a first side of the closure housing where a head of a clamping screw of the worm drive hose clamp is located, wherein lateral edges of the looking strip each have a fastening tab located on a second side of the closure housing facing away from the head of the clamping screw, and wherein the fastening tabs each engage across a lateral edge of the clamping band.

5. The connection according to claim 4, wherein the lateral edges of the locking strip each have a guide tab for the clamping band on the first side of the closure housing, wherein the guide tabs project radially outwardly.

6. The connection according to claim 3, wherein the hose has two additional projections located approximately diametrically opposite to the closure housing on the hose and engaging the lateral edges of the clamping band.

7. The connection according to claim 1, wherein the laterally projecting tabs have prolongations extending in both circumferential directions of the hose, wherein the prolongations are angled at an obtuse angle radially outwardly, wherein the gaps have sidewalls each provided with an undercut, and wherein the prolongations engage the undercuts.

8. The connection according to claim 1, wherein the locking strip has longitudinal edges that are bent radially outwardly.

9. The connection according to claim 1, wherein the locking strip consists of metal.

\* \* \* \* \*